United States Patent [19]

Pardo et al.

[11] Patent Number: 4,485,936
[45] Date of Patent: Dec. 4, 1984

[54] PRESSURE VESSEL INTERLOCK

[76] Inventors: Richard J. Pardo, 1519 Chesaco Ave., Baltimore, Md. 21237; Warren A. Pardo, 311 Red Pump Rd., Bel Air, Md. 21014

[21] Appl. No.: 484,376

[22] Filed: Apr. 12, 1983

[51] Int. Cl.³ ............................................. B65D 45/00
[52] U.S. Cl. ..................................... 220/316; 220/314
[58] Field of Search ................... 220/316, 315, 3, 325, 220/314

[56] References Cited

U.S. PATENT DOCUMENTS

| | | | |
|---|---|---|---|
| 188,395 | 3/1877 | Merrell et al. | 220/314 X |
| 1,109,828 | 9/1914 | Goff | 220/314 X |
| 2,917,200 | 12/1959 | Phelan et al. | 220/316 |
| 3,235,124 | 2/1966 | Kuever | 220/316 |
| 3,976,218 | 8/1976 | Stoermer | 220/316 |
| 4,135,640 | 1/1979 | MacQuilkin et al. | 220/316 |
| 4,325,491 | 4/1982 | Barnhill | 220/316 |

Primary Examiner—Steven M. Pollard
Attorney, Agent, or Firm—Kenneth E. Darnell

[57] ABSTRACT

An improved pressure-activated interlock system for a pressure vessel such as a pressure fryer, the interlock system includes a safety lock which cooperates with a latching mechanism to prevent opening of the pressure vessel while potentially hazardous pressure levels exist within the vessel. The safety lock includes a pin and associated solenoid actuator mounted on an arm which both mounts the latching mechanism and also serves to lift the lid of the pressure vessel. The existence of pressure conditions of a given level within the pressure vessel causes the solenoid to force the pin into engagement with one of a plurality of spaced radial slots formed in a hub portion of the latching mechanism, thereby preventing operation of the latching mechanism and thus opening of the pressure vessel. The solenoid is actuated by means of a pressure switch which directly senses the pressure within the pressure vessel.

12 Claims, 3 Drawing Figures

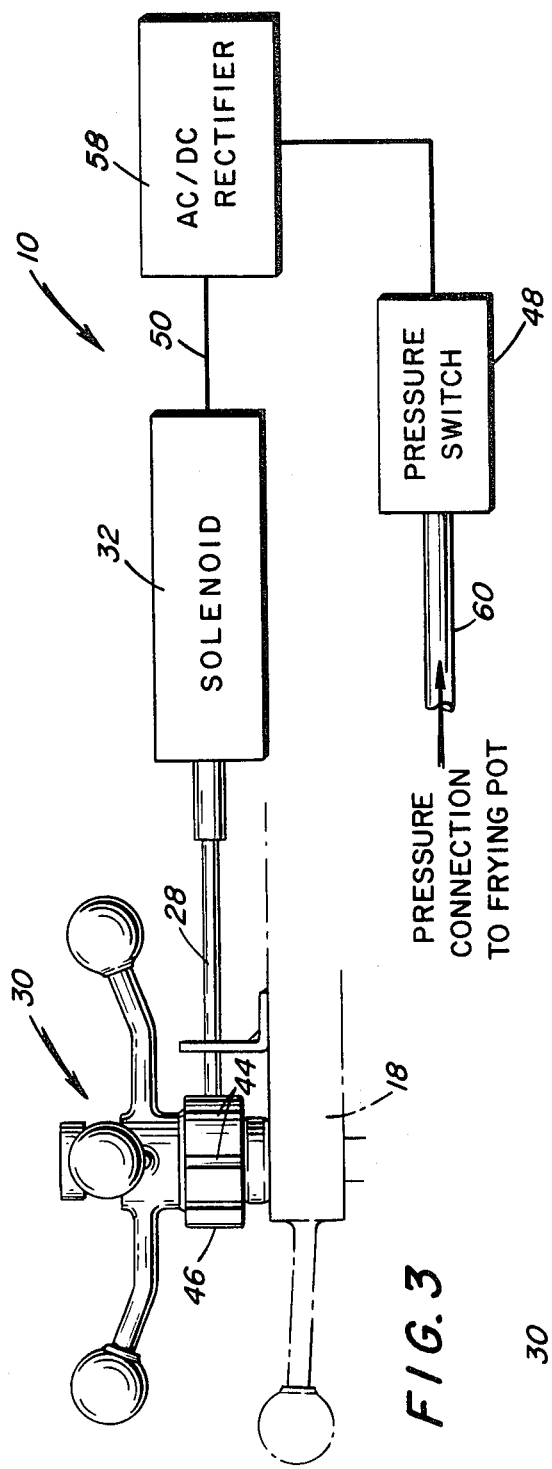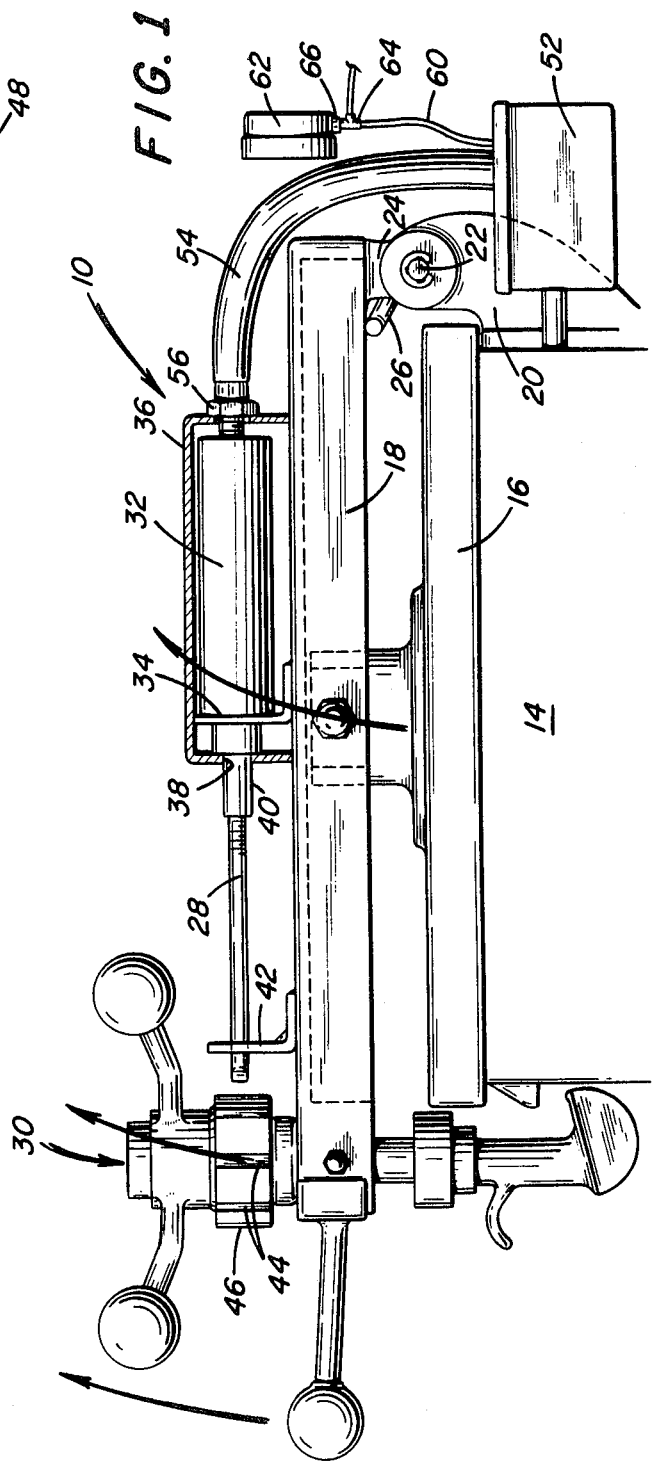

4,485,936

PRESSURE VESSEL INTERLOCK

BACKGROUND OF THE INVENTION

1. Field of the Invention

The invention relates generally to safety interlock systems for pressure vessels and particularly to such systems which are operable with mechanisms for latching a lid to a pressure vessel and for preventing release of the latching mechanism while potentially hazardous pressure conditions exist within the vessel.

1. Description of the Prior Art

Pressure vessels have long been known to be useful in a wide variety of situations, such vessels invariably including a lid which allows access to the interior of the pressure vessel. Such lids must be sealed on closure of the vessel and positively latched by a mechanism which preferably allows ready opening and closure of the lid with a minimum of effort but with a maximum of safety. A common environment in which pressure vessels are used relates to the cooking of foods under pressure, such devices typically being referred to as pressure cookers or pressure fryers. In this use environment, foods are typically cooked in oil and, under the cooking conditions, moisture in the food is released into the oil and causes relatively high pressure conditions to exist within the vessel. While these pressure conditions primarily act to cook foods within the pressure cooker, the pressure conditions also represent potentially hazardous conditions which require care to be taken in the design of the pressure cooker to prevent inadvertent and abrupt removal of the pressure cooker lid during and immediately after the cooking operation when pressure conditions within the cooker are high. Such an inadvertent opening of the pressure cooker allows immediate expansion of the moisture entrapped in the oil, the result being an explosion of the hot oil through the opening normally secured by the lid. An inadvertent and untimely opening of a pressure cooker lid in this manner thus represents a substantial hazard to an operator of the cooker. While latching mechanisms have previously been devised for maintaining the lid of a pressure cooker in place against pressure conditions existing within the cooker, the use of a safety interlock system capable of preventing inadvertent operation of the latching mechanism to open the pressure cooker has been devised in order to prevent opening of a pressure cooker while hazardous pressure conditions exist within the cooker. The safety interlock thus provides an added check to the operator's decision as to whether conditions within the cooker allow safe opening of the cooker. Such a safety interlock must be reliable and relatively incapable of being fouled and thus rendered inoperable even under the conditions encountered in a commercial cooking operation.

Stoermer, in U.S. Pat. No. 3,976,218, provides a pressure fryer safety interlock which prevents operation of a screw spindle and maintains a closure bar in sealing engagement with the lid of a pressure fryer. The Stoermer safety interlock comprises a vertically extending pin which is biased upwardly into an effective engagement with the screw spindle by pressure within the fryer acting against a lid liner, the liner biasing the pin upwardly to prevent rotation of the screw spindle. Since the channel within which the pin is held is vertically disposed with the upper end thereof being essentially open to ambient, fouling of the locking mechanism due to dripping of congealable liquids as well as dropping of solid matter such as breading and the like associated with a cooking operation provides the potential for inadequate operation of the locking structure. Failure of such a safety interlock to operate is hazardous even though the operator of the pressure cooker must primarily rely upon his own personal judgment as to the safety of proceeding with the opening of the pressure cooker.

The present invention intends improvement over the prior art including the safety interlocks previously proposed for use with pressure fryers and the like, the invention particularly providing a safety interlock system operable with a latching mechanism typically employed in a lid closure system of a pressure cooker or similar vessel to positively prevent opening of a pressure vessel lid while hazardous pressure conditions exist within the vessel. According to the present invention, the safety interlock of the present invention is configured to inhibit fouling of the mechanism by congealable liquids and solids such as breading and the like. Further, the present safety interlock is configured to maintain locking capability even during power failure. The particular structure of the present safety interlock system allows essentially continuous operation but at minimum temperature and with minimum wear such that the failure potential of the safety interlock system is minimized. Accordingly, operation of a pressure vessel such as a pressure cooker or fryer is rendered safe to a degree not heretofore realized in the art through the use of the present invention.

SUMMARY OF THE INVENTION

The invention provides a pressure-activated safety interlock system for a pressure vessel, particularly a pressure fryer employed principally for cooking chicken or comparible foods in oil under pressure as is well known in the art. The safety interlock system of the present invention is particularly useful with the latching mechanism described in United States patent application Ser. No. 298,481, filed Sept. 1, 1981, the disclosure of which is incorporated hereinto by reference. The present safety interlock system particularly is intended to substitute for the pressure-operated safety lock described in the aforesaid United States patent application. The latching mechanism with which the present invention finds particular utility and which is disclosed in the aforesaid United States patent application is disposed at the distal or free end of a bar which extends across a lid of a cooker pot, the lid being adapted to sealingly engage upper edges of the pot. The bar is pivotally connected anteriorally to the cooker pot and is pivotally joined to the lid medially of the length of the bar and essentially centrally of the lid. An elongate spindle is mounted to the free end of the bar and has a hook element at one end thereof which is adapted to engage a catch or lug formed in the pot. Displacement of the spindle in a direction upwardly or outwardly of the lid causes the hook element to engage the catch and to force the lid over the peripheral edges of the pot opening to seal the opening in the manner described in the aforesaid United States patent application.

Use of the latching mechanism of Ser. No. 298,481 with the present safety interlock system does not require modification of the latching mechanism or of the lid and closure bar structures. In the system of Ser. No. 298,481, a pin is horizontally mounted within a cylindrical pressure receptacle, the receptacle being mounted upon the closure bar and communicating through a pressure tube with the interior of the cooking pot. A first end of the pin extends outwardly of a forward end of the pressure receptacle to engage one of a plurality of radially disposed slots formed in the hub of the latching mechanism, thereby to prevent operation of the latching mechanism and thus opening of the lid while the pin is engaged with the hub. The present safety interlock system continues use of the pin to engage the hub of the latching mechanism and thus prevent operation of said latching mechanism. However, the pin of the present safety interlock system is carried by a pull-type DC solenoid valve which maintains the pin out of engagement with the hub of the latching mechanism while power is supplied to the solenoid valve. The solenoid valve electrically connects to a pressure switch which discontinues power to the solenoid valve when the pressure within the cooker reaches a predetermined value. Discontinuation of electrical power to the solenoid valve thus results in a spring within the solenoid valve causing the pin to be biased outwardly in a direction toward the hub of the latching mechanism to allow engagement of the distal end of the pin with the radially disposed slots formed in said hub. Since the pin is directed into a locking position when power is discontinued to the solenoid valve, a power failure or other inadvertent discontinuation of power will cause the present safety interlock system to engage the latching mechanism and prevent opening of the pressure vessel, thereby providing additional operator safety even during periods of emergency power loss. The safety interlock system of the invention accordingly prevents opening of the pressure vessel while sufficient pressure exists within the pressure vessel to constitute a hazard in the event of inadvertent opening of the lid.

The pull-type solenoid valve preferably used according to the invention is operated by direct current, an AC/DC rectifier being interposed between the solenoid valve and the pressure switch which activates the solenoid valve. By operation of the solenoid valve with direct current, lower heat loading is experienced relative to the use of an AC solenoid, thereby increasing the useful life of the solenoid portion of the system and reducing the probability of service failure. In virtually continuous service, substantially reduced operating temperatures are encountered with the DC solenoid valve.

Accordingly, it is a primary object of the present invention to provide a simple, safe and reliable safety interlock system capable of preventing operation of a latching mechanism used to maintain the lid of a pressure vessel such as a pressure fryer in locked position while potentially hazardous pressure conditions exist within the pressure vessel.

It is another object of the present invention to provide a safety interlock system for a pressure vessel wherein the interlock system is resistant to wear and failure in use, including failure during inadvertent discontinuation of power.

It is a further object of the invention to provide a safety interlock system for a pressure fryer which cooperates with a latching mechanism to prevent operation of the latching mechanism in a lid-opening sense when hazardous pressure conditions exist within a cooking pot of the fryer, the safety interlock system comprising a pin disposed in a horizontal sense and which engages a hub of the associated latching mechanism to prevent operation of the latching mechanism while hazardous pressure conditions exist within the fryer or during power failure.

Further objects and advantages of the invention will become more readily apparent in light of the following detailed description of the preferred embodiments.

BRIEF DESCRIPTION OF THE DRAWINGS

FIG. 1 is an elevational view in partial section of the safety interlock system of the present invention;

FIG. 3 is a diagram illustrating the functional interrelationships of the several components of the present safety interlock system.

DESCRIPTION OF THE PREFERRED EMBODIMENTS

Figure 2:
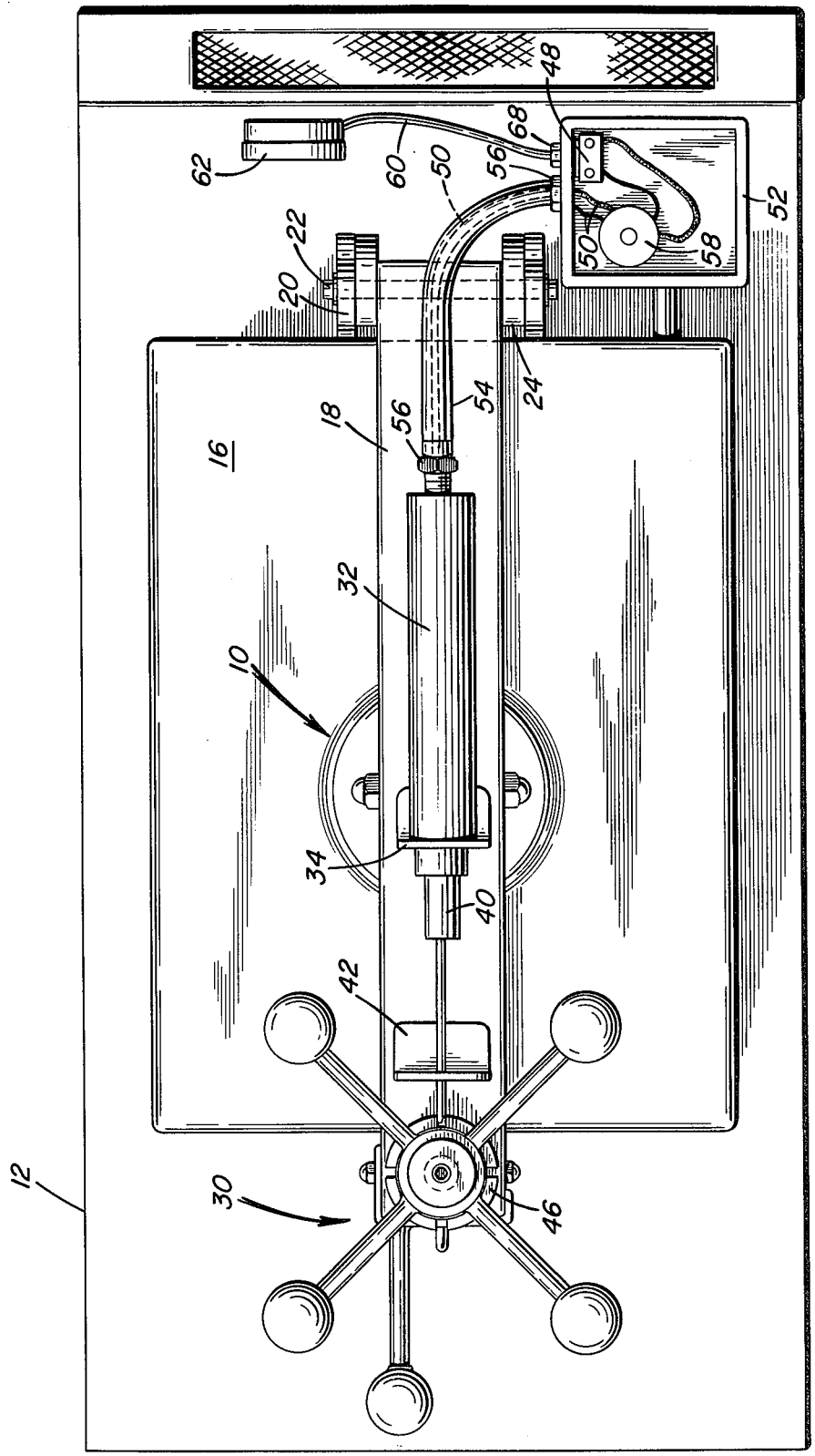
FIG. 2 is a plan view of the present safety interlock system.

Referring now to the drawings, the safety interlock system of the invention can be seen generally at 10 and is seen to be mounted generally on upper portions of cabinet 12 of a pressure cooker which includes a frying pot 14. Although not shown in the drawings, the cabinet 12 also houses conventional mechanisms such as oil filtration apparatus, control apparatus and the like in a well-known fashion, the pressure cooker being essentially conventional in structure and operation in essentials other than the structure and operation of the safety interlock system 10. In particular, the pressure cooker and latching mechanism shown and described in United States patent application Ser. No. 298,481, filed Sept. 1, 1981 are preferred for use with the present safety interlock system 10. In order to simplify description of the use environment of the safety interlock system 10, the disclosure of United States patent application Ser. No. 298,481 is incorporated hereinto by reference. It is further to be understood that the safety interlock system 10 of the present invention essentially substitutes in the disclosure of Ser. No. 298,481 for the pressure-operated locking mechanism 32 of the aforesaid patent application. As is the case with the pressure-operated locking mechanism 32 of the aforesaid patent application, the safety interlock system 10 acts in concert with the latching mechanism referred to generally at 30 in the aforesaid patent application to prevent opening of lid 16 when hazardous pressure conditions exist within the frying pot 14. For convenience, the latching mechanism shown at least in part herein will be referred to as the latching mechanism 30 in order to show correspondence to equivalent structure in the aforesaid patent application. Certain other structural elements shown in the aforesaid patent application will also be similarly referred to by like numerals in the present disclosure.

In order to complete description of structural portions of the pressure cooker directly operable with the safety interlock system 10, it is to be noted that the lid 16 of the frying pot 14 seals peripheral edges of the frying pot, which edges define the opening closed by the lid 16. A bar 18 is pivotally mounted to a rear exterior wall of the frying pot 14 in a conventional manner by means of spaced arcuate stanchions 20 and a mounting pin 22 received through the stanchions 20 and through mounting arms 24 extending from the bar 18. A spring 26 is mounted between the stanchions 20 and the bar 18 in a known manner to exert a force upwardly on the bar to cause upwardly pivoting movement of the bar 18 and thus opening of the lid on release of restraints to opening of the lid provided by the latching mechanism 30. The bar 18 is pivotally mounted to the lid 16 as is described in Ser. No. 298,481 to allow force to be exerted evenly over the lid 16 for effective sealing thereof.

Active portions of the safety interlock system 10 are seen to be mounted along upper surfaces of the bar 18, these active portions particularly comprising a pin 28 carried by a solenoid 32. The pin 28 is seen to correspond in structure and operation to the locking dowel 218 described in the aforesaid patent application, the pin 28 being constructed and usable according to the several embodiments thereof as indicated in the aforesaid patent application. The solenoid 32 is seen to be mounted to the bar 18 by means of a simple L-shaped mount 34 and is covered by cover 36 having an aperture 38 formed in a forward end thereof and through which solenoid arm 40 extends. While the solenoid arm 40 could be configured as having a length capable of functioning to include the functions of the pin 28, practical considerations typically dictate that the pin 28 be threaded at its anterior end to mate with a threaded recess formed in the distal end of the solenoid arm 40. The pin 28 thus extends toward the latching mechanism 30 and through an L-shaped pin guide 42. When the safety interlock system 10 is in the locked position, the distal end of the pin 28 engages one of the vertical slots 44 formed regularly in the exterior surface of hub 46 and radially about the periphery thereof. The slots 44 and the hub 46 of the present disclosure correspond to the slots 222 and the hub 100 of the disclosure of Ser. No. 298,481. When the distal end of the pin 28 is engaged with one of the slots 44, the latching mechanism 30 cannot be turned in order to release the lid 16 from a seated, sealed and latched position over the opening of the frying pot 14. According to the present invention, the pin 28 engages one of the slots 44 in the hub 46 when a sufficiently high pressure exists within the frying pot 14 to constitute a hazard or when power is discontinud to the system 10.

The solenoid 32 is preferably taken to be a pull-type DC solenoid valve which may preferably take the form of linear solenoid valve Model L12-A-M5-L-E4-208C-24 such as is manufactured by the G. W. Lisk Company and which is designed for continuous duty at 24 watts power. The preferred solenoid valve conveniently is provided with a ⅜ inch stroke, a 2 lb. pull and has a 4 ounce spring return. A pull-type solenoid is preferred according to the present invention in order that the conventional spring return within such a solenoid actually causes the pin 28 to be biased into locking engagement with the latching mechanism 30 on discontinuation of power to the solenoid 32 such as by operation of a pressure switch 48 which senses the build-up of pressure within the frying pot 14 to a predetermined level, such as one pound of pressure above atmospheric pressure. Essentially, electrical power acts to operate the solenoid 32 at all times when pressure within the frying pot 14 is either at atmospheric or at a level, such as below 8/10 pound of pressure, which allows safe operation of the latching mechanism 32 to open the lid 16. However, the existence of pressure conditions within the closed frying pot 14 which are at or above 1.0 pound of pressure, for example, causes the pressure switch 48 to discontinue power to the solenoid 32 and to thereby cause the spring portion of the conventional solenoid to direct the distal end of the pin 28 into locking engagement with the latching mechanism 30. As is seen in FIGS. 1 and 2, electrical leads 50 extending from the solenoid 32 to control box 52 are housed by tubing 54 which connect to the cover 36 and to the control box 52 by means of appropriate fittings 56.

An AC/DC rectifier is interposed in the circuitry between the solenoid 32 and the pressure switch 48. The rectifier thus converts the usual 240 volt AC current to 240 volt DC current so that a DC solenoid valve can be used as the solenoid 32. It is preferred to utilize a DC solenoid from the standpoint of practicality since conventional AC solenoid coils heat up more rapidly and operate at a higher temperature than corresponding DC powered solenoids. The useful life of the solenoid 32 is therefore increased and service failures are less likely when the solenoid 32 comprises a DC unit since the present system 10 is typically used on a nearly continuous basis. It is to be understood, however, that an AC solenoid can be used, though perhaps with reduced reliability, such use thereby eliminating the need for the rectifier 58.

The pressure switch 48 may conveniently be selected to compirse a Qualitrol Corporation Model 146 pressure switch. The switch 48 senses both pressure rise and fall and uses a normally closed terminal to open and close the linear solenoid 32. Pressure is seen to be transmitted to the diaphragm (not shown) of the pressure switch 48 through pressure tube 60 which may conveniently comprise a ¼ inch outer diameter length of tubing which is connected to live steam within the frying pot 14 by means of an appropriate connection such as at the pressure gauge 62. It is to be understood that pressure connection between the pressure switch 48 and the interior of the frying pot 14 can be made in a variety of ways including direct connection into the frying pot or connection to any steam line brought to the frying pot 14 for any other purpose. A T-connection in the steam line leading to the pressure gauge 62 from the frying pot 14 can be utilized conveniently with one leg of the T connecting to the pressure tube 60 by means of appropriate fitting 66. Similar fittings 68 connect the pressure tube 60 to the control box 52 and to the pressure switch 48 in a conventional manner.

The pressure switch 48 normally allows completion of the electrical circuit which provides power to the solenoid 32, the solenoid 32 thus pulling the distal end of the pin 28 away from engagement with the latching mechanism 30. When power is off for any reason, including emergency conditions, the pin 28 is thus engaged with the latching mechanism 30 to prevent operation thereof. When the main power switch (not shown) is turned on during normal operation of the pressure cooker, the solenoid 32 pulls the pin 28 back from engagement with the latching mechanism 30, power always being required to pull the pin the required distance to be clear of the slots 44 in the hub 46. As indicated previously, discontinuation of the power to the system 10 either intentionally or in the event of a power failure or similar emergency, causes the pin 28 to move forwardly due to the bias of the spring (not shown) in the solenoid 32 such that the latching mechanism 32 becomes locked.

In normal operation, the main power switch (not shown) is activated and the usual timing mechanisms associated with the pressure cooker are set, including time and temperature settings. A frying basket (not shown) filled with a food which is to be fried is then placed in the frying pot 14 and the lid 16 is latched over the frying pot 14 in the manner described in the aforesaid patent application. During these operations, the solenoid 32 holds the pin 28 in an unlocked position out of engagement with the latching mechanism due to the fact that power is being supplied to the solenoid 32.

As the food product heats up within the frying pot 14, moisture is given off in the form of steam and pressure increases within the frying pot 14 past a predetermined value, such as one pound psig. The pressure rise within the frying pot 14 is experienced by one side of the diaphragm (not shown) of the pressure switch 48 since the pressure within the frying pot 14 is transmitted to the pressure switch 48 through the tube 60. At a predetermined pressure level, such as one pound of gauge pressure as noted, the pressure switch is "tripped" to close the power circuit to the rectifier 58 and thus to the solenoid 32 so that the spring function within the solenoid 32 pushes the pin 28 into the locked position such that one of the slots 44 in the hub 46 of the latching mechanism 30 is engaged either immediately or upon partial rotation of the latching mechanism 30 as is described in the aforesaid patent application. As long as the pin 28 is thus engaged with the latching mechanism 30, the lid 16 cannot be removed from sealing engagement with the opening of the frying pot 14. During the cooking operation, the internal pressure builds to an operational pressure of approximately 12 psig and, at the end of the timed cooking cycle, steam is discharged from the frying pot through a condensate stack (not shown) through conventional timers and steam solenoid valve discharge systems to thereby clear the frying pot 14 of accumulated steam pressure. When the pressure within the frying pot 14 reaches a pedetermined level, such as 0.8 psig, the pressure experienced by the pressure switch 48 once again causes power to be applied to the solenoid 32 thereby to pull the pin 28 out of engagement with the latching mechanism 30 such that the lid 16 can be removed from the frying pot 14.

The safety interlock system 10 of the present invention is thus seen to provide simple, inexpensive and wear-resistant structure capable of effective locking of a latching mechanism utilized to hold a lid over the opening of a frying pot such as commonly employed in a pressure cooker. The present system 10 is seen to be reliable in operation not only during normal conditions but also during conditions such as are experienced during power failures and the like due to the ability of the system 10 to function in a positive locking mode without the need for electrical power. While the system 10 has been explicitly described as detailed hereinabove, it is to be understood that the invention can be configured otherwise than as explicitly shown and described herein without departing from the intended scope of the invention and that the structure of the invention can be utilized in use environments other than the environment explicitly shown. Accordingly, the scope of the invention is seen to be defined by the recitations of the appended claims.

What is claimed is:

1. In an apparatus for securing a lid of a pressure vessel over an opening thereof including a latching mechanism for holding the lid in a secured position over said opening, the improvement comprising safety interlock means carried on the apparatus in opposing relation to the latching mechanism for inhibiting lid-releasing operation of the latching mechanism during the existence of hazardous pressure conditions within the pressure vessel;

electrical power means associated with the apparatus and electrically connected to the safety interlock means for operating the safety interlock means; and, means associated with the safety interlock means for positively locking the latching mechanism against release of the lid when power from the electrical power means to the safety interlock means is discontinued.

2. In the apparatus of claim 1 wherein the latching mechanism has at least one recess formed in an exterior wall thereof and wherein the safety interlock means comprise:

a pin mounted for horizontal movement to engage a distal end of the pin within the recess to inhibit motion of the latching mechanism; and, means engaging an anterior end of the pin for exerting pressure on the pin to displace said pin into engagement with the latching mechanism, the pressure exerting means being responsive to pressure conditions existing within the pressure vessel.

3. In the apparatus of claim 2 wherein the last-mentioned means comprise:

a solenoid;

a pressure switch for actuating the solenoid on attainment of predetermined pressure conditions within the pressure vessel to cause the pin to engage the recess in the latching mechanism; and, means for communicating the pressure within the pressure vessel to the pressure switch.

4. In the apparatus of claim 3 wherein the solenoid is a pull-type DC linear solenoid having a spring return which biases the pin into engagement with the latching mechanism on discontinuation of power to the solenoid and wherein the pressure switch comprises means for discontinuing power to the solenoid on attainment of predetermined pressure conditions within the pressure vessel.

5. In the apparatus of claim 3 wherein the improvement further comprises an AC/DC rectifier disposed in circuitry between the solenoid and the pressure switch to provide direct current to the solenoid.

6. In the apparatus of claim 4 wherein the improvement further comprises an AC/DC rectifier disposed in circuitry between the solenoid and the pressure switch to provide direct current to the solenoid.

7. The apparatus of claim 1 wherein the last-mentioned means comprises a pull-type DC linear solenoid having a spring return.

8. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, a portion of the latching means engaging the catch on the body of the vessel for latching the bar and associated lid over the opening, the latching means further comprising an elongated spindle carried in and extending through a recess in the free end of the bar, the spindle terminating at one end in a hook element constituting the aforesaid portion of the latching means which is adapted to engage the catch on the body of the vessel, the other end of the spindle having a threaded portion, and, a hub having a threaded bore extending therethrough and matingly receiving at least a portion of the threaded portion of the spindle therewithin, the hub being rotatable to cause the spindle to be displaced longitudinally within the threaded bore by virtue of the action of the mating threads of the bore and spindle, thereby to displace the hook element relative to the catch to latch or unlatch the bar and associated lid over the opening of the vessel, the hub being provided with at least one slot in an exterior wall thereof;

safety interlock means carried by the bar and disposed adjacent to the hub for inhibiting the rotation of the hub during the existence of hazardous pressure conditions within the pressure vessel, the safety interlock means comprising a pin mounted for horizontal movement to engage a distal end of the pin within the slot to inhibit rotation of the hub, and, pressure exerting means engaging an anterior end of the pin for exerting pressure on the pin to displace said pin into engagement with the hub, the pressure exerting means being responsive to pressure conditions existing within the pressure vessel; and, electrical power means electrically connected to the safety interlock means for operating the safety interlock means, the pressure exerting means comprising a solenoid, a pressure switch for actuating the solenoid on attainment of predetermined pressure conditions within the pressure vessel to cause the pin to engage the slot in the hub, and means for communicating the pressure within the pressure vessel to the pressure switch.

9. The apparatus of claim 8 wherein the solenoid is a pull-type DC linear solenoid having a spring return which biases the pin into engagement with the slot in the hub on discontinuation of power to the solenoid and wherein the pressure switch comprises means for discontinuing power to the solenoid on attainment of predetermined pressure conditions within the pressure vessel.

10. The apparatus of claim 8 wherein the last-mentioned means further comprises an AC/DC rectifier disposed in circuitry between the solenoid and the pressure switch to provide direct current to the solenoid.

11. The apparatus of claim 8 and further comprising means associated with the safety interlock means for positively locking the latching mechanism against release of the lid when power to the safety interlock means is discontinued.

12. The apparatus of claim 11 wherein the last-mentioned means comprises the solenoid and the solenoid is a pull-type DC linear solenoid having a spring return which biases the pin into engagement with the slot in the hub on discontinuation of power to the solenoid.

* * * * *